Patented June 20, 1950

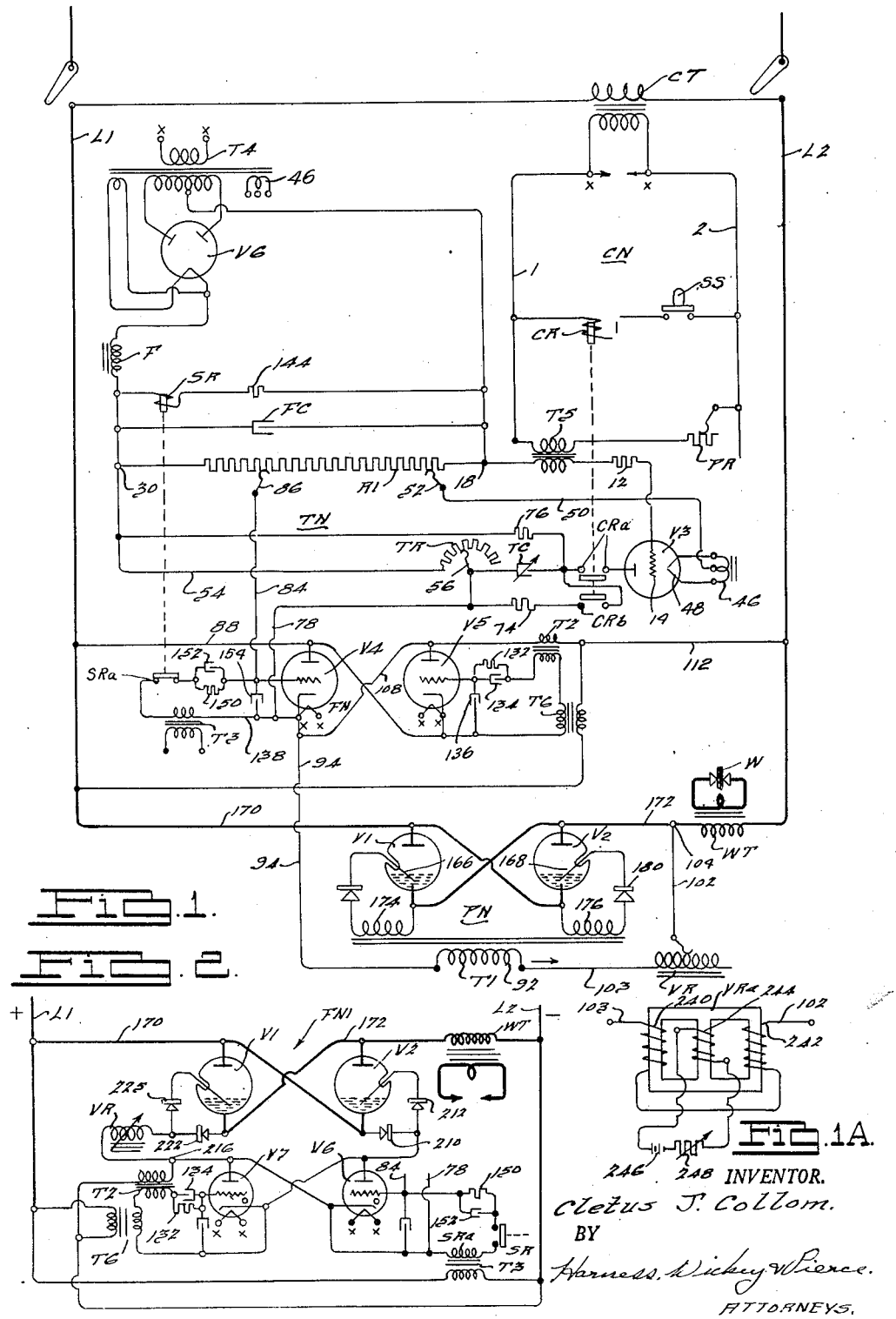

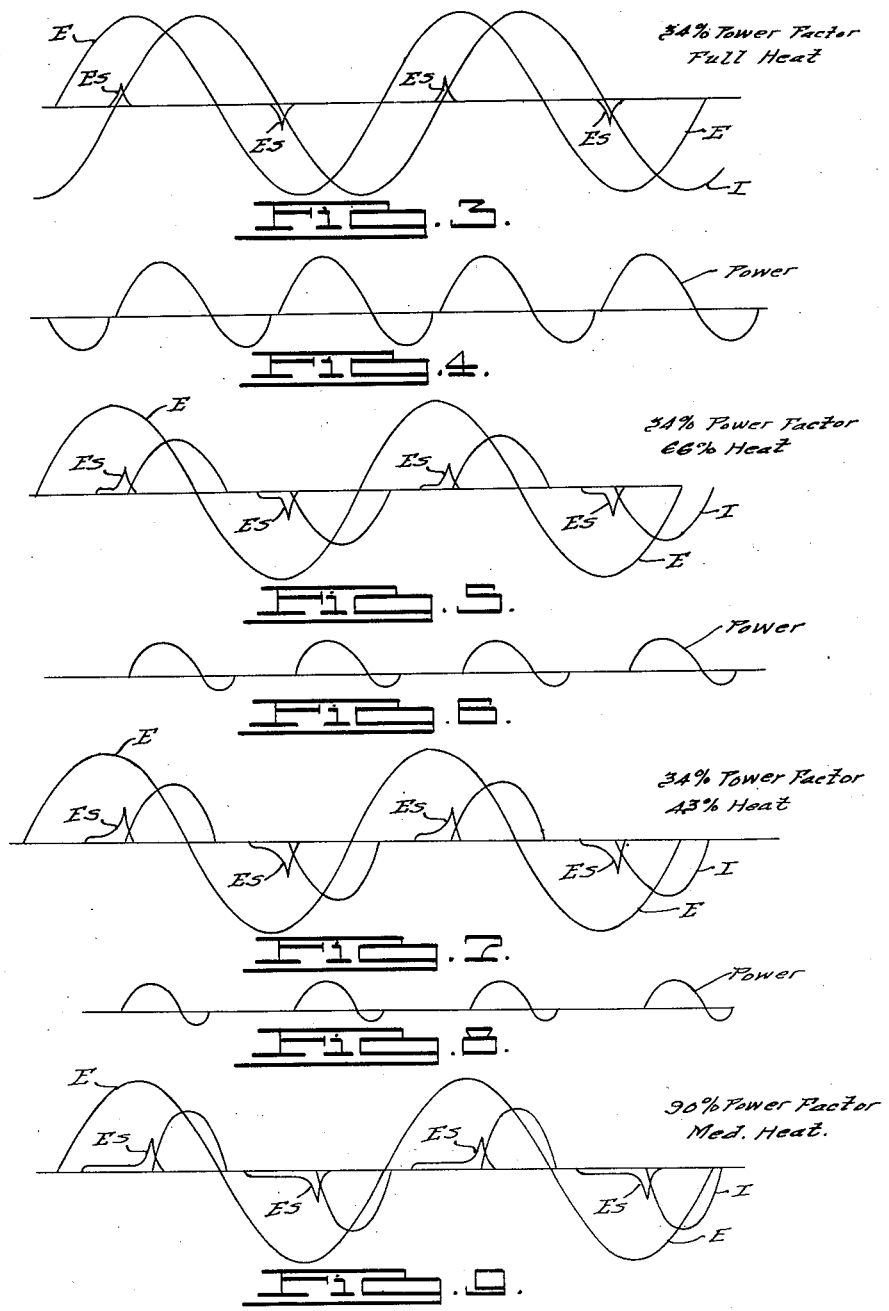

2,512,482

UNITED STATES PATENT OFFICE 2,512,482

ELECTRICAL CONTROL APPARATUS

Cletus J. Collom, Southfield Township, Oakland County, Mich., assignor to Weltronic Company, Detroit, Mich., a corporation of Michigan Application July 6, 1946, Serial No. 681,758

14 Claims. (Cl. 315—268)

This invention relates to electrical control systems and is particularly directed toward an improved and simplified means for effecting control of the power output of mercury arc rectifiers of the so-called mercury-pool immersion-igniter type.

The principal objects of this invention are to provide a simple, reliable, and efficient system of the aforesaid type; to provide in such a system means whereby the control tube or electric valve can be controlled in its point of firing with respect to the voltage wave whereby the power transmitted by the valve can be accurately controlled; to provide in such a system means whereby the point of firing with respect to the voltage wave can be easily and conveniently adjusted throughout the useful output range of the system; to provide a phase-shifting system comprising a saturable impedance element, which system provides a sudden application of the critical firing potential to the control valve; to provide in such a phase-shifting circuit a saturable impedance means controlling the voltage input to the igniter circuit of an electric valve such that critical voltage for firing the electric valve is substantially instantaneously applied.

With the above, as well as other and more detailed objects in view which appear from the following description and the appended claims, there is shown in the drawings a preferred but illustrative embodiment of the invention.

In the drawings, which are to be taken as part of this specification and in which like elements are indicated in the various figures by the same reference numerals, Fig. 1 is a diagrammatic view of a control system embodying this invention, Fig. 1—A is a diagrammatic view of a further modification of the invention, Fig. 2 is a partial view showing a modification of the system of Fig. 1, and Figs. 3–10 are graphic illustrations of the operation of a welding mechanism controlled by the new control system to provide for various power outputs under two power factor conditions. Figs. 3, 5, and 7 show the relation of line voltage, welding current and igniter voltage at various welder heat settings with a low power factor load. Figs. 4, 6, and 8 show the power relations of the conditions represented in Figs. 3, 5, and 7 respectively, while Figs. 9 and 10 show the relationship of line voltage, welder current, igniter voltage and power at a high power factor load and at reduced welding heat.

Referring to the drawings, the control system comprises a control network CN, a time-controlling network TN, a firing network FN, and a power network PN, and, generally stated, the operation of the system is as follows.

Closure of the starting switch SS of network CN closes the plate circuit of an electronic valve V3 of the network TN through a timing resistance TR and a timing condenser TC. At a predetermined point on the voltage cycle between lines L1 and L2, as determined by the setting of the variable phase-controlling resistor PR of the network CN, the transformer T5 will bias the grid of valve V3 with respect to the cathode thereof so that valve V3 will become conductive. Current will then flow through the resistor TR and change the bias between the grid and cathode of electric valve V4 rendering V4 conductive and energizing the firing network FN of electric valves V1 and V2 of the power network PN. This change in bias of the valve V4 continues once each cycle until the timing condenser TC receives a critical charge, at which time the voltage drop across the resistor TR is insufficient to bias the valve V4 into a conducting condition. In order that the firing network can be rendered conductive once each half cycle, an electric valve V5 is arranged in trailing relationship with valve V4 and is rendered conductive each half cycle following the half cycle that valve V4 was conducting. Energization of the network FN acts, as will be hereinafter described, to render the electric valves V1 and V2 conductive to supply current to the welding transformer WT of the network PN, the firing points of valves V1 and V2 being variable in accordance with the setting of regulatable impedance VR.

Considering the above networks in more detail, network CN comprises a pair of supply conductors 1 and 2 energized from the secondary winding of control transformer CT, the primary winding whereof is supplied with electrical energy from the alternating current supply lines L1 and L2. The actuating coil of the starting control relay CR is connected between the supply conductors 1 and 2 and in series with a manually operable starting switch SS whereby the relay CR can be energized to initiate a welding operation. The grid biasing transformer T5 has one terminal of its primary winding connected across supply conductors 1 and 2 in series with variable phase-controlling resistor PR. The secondary winding of the transformer T5 has one of its terminals connected through a resistance 12 to the grid 14 of the valve V3 and has its other terminal connected to the negative terminal 18 of a potentiometer resistor R1.

The resistor R1 is supplied with direct current by a full-wave rectifying valve V6 energized by the transformer T4 which has its primary winding connected across the secondary winding of the control transformer CT, as indicated by the characters x—x. Transformer T1 has the usual center tapped secondary winding, the end connections whereof are connected to the anodes of the valve V6 and the center tap thereof is directly connected to the negative terminal 18 of the potentiometer resistor R1. The positive terminal 30 of the potentiometer resistor R1 is connected, through a filter choke F, to the cathode of the valve V6. A filter condenser FC is connected across the terminals 18 and 30 of the resistor R1 so that the potential across R1 will be maintained substantially constant. The transformer T4 has a second secondary winding which is suitably connected to the valve V6 for heating the cathode thereof to render the valve V6 conductive. The transformer T4 has a third secondary winding 46 having a center tap connection and end connections, and shown, for convenience, near valve V3. The end connections of winding 46 are connected to the cathode of the valve V3 to maintain the cathode at its elevated temperature and in an emissive condition. The center tap connection of the winding 46 is connected by means of conductor 50 to an adjustable contact 52 of the potentiometer resistor R1, whereby a blocking bias voltage is normally applied by the resistor R1 between the grid 14 and cathode 48. The secondary winding of transformer T5 is so connected with respect to the potential of resistor R1 that once each cycle the grid 14 of the valve V3 is positively biased with respect to the cathode 48 so that the valve V3 is operable to conduct at a predetermined instant each voltage cycle of the conductors 1 and 2, the point being determined by the setting of the resistor PR. Preferably, transformer T5 is of the peaking type, and the timing of its output is such that it applies its conducting bias to valve V3 with respect to the voltage of the source at substantially the power-factor angle of the welding load.

The timing control network TN comprises a conductor 54 extending from the positive terminal 30 of the potentiometer R1 to one terminal of the variable timing resistor TR. The other terminal of resistor TR is connected through the timing condenser TC and contacts a of relay CR to the anode of the valve V3. Energization of the coil or relay CR closes its contact a and opens its contacts b. Contacts b of relay CR normally complete a discharge circuit for condenser TC through a resistor 74. A resistor 76 is connected in parallel with resistor TR and condenser TC.

Coming now to the firing network FN, a biasing potential is normally applied to the valve V4 through a conductor 78 connecting the terminal 56 with the cathode of the valve V4 and a conductor 84 connecting the grid of the valve V4 to a second variable terminal 86 of the resistor R1. The terminal 86 is located on the resistor R1 at a point which is negative with respect to terminal 30, and, when there is no current flowing through the valve V3, the terminal 56 will be at the potential of the terminal 30. Normally, therefore, valve V4 is biased off by the potential between terminals 86—56. When valve V3 is rendered conducting, on the other hand, terminal 56 is elevated to a potential above that of terminal 86, thereby rendering valve V4 conductive. As is described below, this conductive bias is maintained during the welding period, as determined by the setting of terminal 56 along resistor TR which in turn determines the critical charging interval of condenser TC.

The firing network valves V4 and V5 are arranged back to back, so that alternating current can flow in the network FN. The valve V5, as stated hereinbefore, is further arranged to trail the valve V4 so that it will conduct in each half cycle which immediately follows a conducting half cycle of valve V4. The cathode of valve V5 and the anode valve V4 are connected together and to line L1 by conductor 88. The anode of valve V5 and the cathode of valve V4 are connected together and to one terminal of the primary winding 92 of the firing transformer T1 by a conductor 94. The other terminal of the winding 92 is directly connected to one terminal of the variable reactor VR, which has its other terminal connected by conductor 102 to the terminal 104 of the primary winding of the welding transformer WT. The other terminal of the welding transformer primary winding is connected to the line L2.

The anode of the valve V5 is connected to line L2 through the primary winding of a control transformer T2. The secondary windings of transformer T2 and its companion biasing transformer are connected in series between the grid and cathode of valve V5, and this series circuit also includes a filter network comprising resistor 132 and condenser 134. An additional filter-condenser 136 is connected directly between the grid and cathode of valve V5.

The cathode of valve V4 is connected by means of a conductor 138 to one terminal of the secondary winding of a transformer T3, the other terminal whereof is connected through contacts SRa of a protector relay SR to the grid of the valve V4. Interposed in this series circuit is a resistance 150 and a condenser 152 arranged to parallel relationship with each other. A condenser 154 is connected between the cathode and the grid of the valve V4. The primary winding of the transformer T3 is connected across the secondary winding of the control transformer CT. The actuating coil of the relay SR is arranged in series circuit with a resistor 144, which circuit is connected across the terminals 18 and 30 of the potentiometer resistor R1. Normally the coil SR1 remains energized maintaining the circuit through the contacts SRa open, but, upon failure or inactivity of the rectifier V6, closes the same, so that the output potential of the transformer T3 applies a blocking potential to valve V4. Thus, relay SR prevents firing of the valve V4 whenever the desired direct current potential for one reason or another is not across the potentiometer resistor R1.

The power network PN for the welding transformer WT comprises a pair of usual, discontinuous, immersed igniter valves V1 and V2 conventionally arranged in antiparallel or back-to-back relation for controlling the flow of alternating current to the welding transformer WT.

In accordance with the arrangement claimed in the copending Undy application Serial No. 568,317, filed December 15, 1944, now Patent No. 2,470,119, secondary windings 174 and 176 of the firing transformer T1 are connected respectively between the cathodes and igniters of the valves V1 and V2 in series with auxiliary rectifiers 178 and 180, which may be of the copper-oxide type. The polarities of the secondary windings 174 and that of the rectifier 178 are so arranged relative to the potential supplied between the anode and the cathode of the valve V1 that current will flow in the igniter circuit only in a direction from the igniter to the cathode and then only when the potential of the anode is positive with respect to that of the cathode. Corresponding comments apply to the firing circuit for valve V2.

The operation of the control system of Fig. 1 is as follows: The closure of the line switches in line L1 and L2 energizes the control transformer CT which places a potential across the conductors 1 and 2 of the control network CN, energizes the transformers T3, T4, T5, and T6 and the heaters for the valves V4 and V5. Energization of the transformer T4 causes the cathodes of the valves V3 and V6 to be heated to an emissive condition, at which time rectifier V6 causes the desired D. C. potential to appear between the terminals 18 and 30 of the potentiometer resistance R1. Energization of the resistance R1 acts to bias the grid of valve V3 negatively with respect to its cathode and to bias the grid of valve V4 negatively with respect to its cathode. Energization of the control network CN energizes the transformer T5 which is operable to impress a positive biasing potential upon the grid of the valve V3 once each cycle of the voltage of the lines L1 and L2. The variable resistor PR in series circuit with the transformer T5 controls the angle of the voltage of the secondary of the transformer T5 with respect to the voltage between conductors 1 and 2 so that the valve V3 may be rendered conductive at the desired point on the voltage wave of the lines L1 and L2, and, as stated above, this action preferably takes place at the power-factor angle of the welding load.

After the work W has been properly positioned between the welding electrodes, the starting switch SS is closed, energizing the control relay CR and causing it to close its contacts $a$ and open its contacts $b$. The next time the transformer T5 renders the grid of valve V3 positive with respect to its cathode, valve V3 will conduct so that current will flow in network TN from the terminal 30 through the conductor 54, the timing resistor TR, the timing condenser TC, the closed contacts $a$ of relay CR, the valve V3, and the conductor 50 back to the terminal 52 of the resistor R1. This just-mentioned circuit is established during every corresponding half cycle of the voltage impressed upon the lines L1 and L2, and current will continue to flow therethrough in each conducting half cycle of valve V3 until the timing condenser TC is fully charged. No substantial discharge of condenser TC takes place through resistors TR and TC during nonconducting half cycles of valve V3, and consequently the charge on condenser TC builds up incrementally.

Flow of current through the timing resistor TR lowers the potential of the terminal 56 thereof below that of the potential of the terminal 86 of the resistor R1 so that the grid of valve V4 is biased positively with respect to its cathode, and the valve V4 will be rendered conductive. This lowering of the potential of the terminal 56 of the timing relay TR will occur once each cycle that the valve V3 is conductive until such time as the timing condenser TC receives a critical charge, after which the current flow through the resistor TR will not be sufficient to render the terminal 56 thereof at a potential sufficiently below that of the potential of the terminal 86 to render the grid 82 sufficiently positive with respect to the cathode 80 to render the valve V4 conductive. The length of time required to charge the condenser TC to its critical point will be the welding time or the time that the welding transformer is energized to supply a welding current between the electrodes WE. Subsequent to this time, the starting switch SS is opened, de-energizing the control relay CR so that the contacts CRa thereof are opened and the contacts CRb thereof are closed. Closure of contacts CRb of relay CR establishes a discharge circuit through the resistor 74 for discharging the timing condenser TC whereby the timing condenser TC is made ready for a subsequent closure of switch SS to control the time that welding current is supplied to the welding transformer.

The valve V5, as stated hereinbefore, is arranged in operation to trail the operation of the valve V4 so that for every cycle in which valve V4 is rendered conductive, valve V5 will be rendered conductive during the subsequent half cycle so that the valves V1 and V2 will conduct current in the power network PN twice each voltage cycle during the welding interval. When valve V4 conducts, current flows from line L1 through conductor 88, valve V4, conductors 94 and 108, transformer T2, and conductor 112 to line L2. During this interval current is also flowing through transformer T6. Normally with transformer T2 de-energized, the voltage pulse applied between the grid and the cathode of valve V5 by the secondary coil of transformer T6 renders the grid negative with respect to the cathode during the time the anode of valve V5 is positive with respect to its cathode. At the conclusion of the conductive half cycle of valve V4, the flux in transformer T2 collapses and applies a transient or "kick" voltage between the grid and cathode of valve V5, which overcomes the bias of transformer T2 and renders valve V5 conductive.

Upon closure of the firing network FN, due to the valves V4 and V5 being rendered conductive as just described, current will flow between lines L1—L2, through the valve V4 or valve V5 as the case may be, the conductor 94, the primary coil 92 of the transformer T1, the variable reactor VR, and the welding transformer WT to the line L2. As stated hereinbefore, the variable reactor VR is of the saturating core type, so that, upon initial energization of and current flow through the firing network FN, substantially the entire potential across the series arranged transformer T1 and variable reactor VR will appear across the variable reactor VR until such time as the core of the reactor VR becomes saturated. After the reactor VR becomes saturated, the voltage drop thereacross drops substantially, and a substantial voltage appears across the primary coil 92 of the transformer T1, thereby causing the secondary coils 174 and 176 of the transformer T1 to supply their respective igniter circuits with potentials which abruptly become equal to or greater than the critical potential required to render the valves V1 and V2 conductive, causing the said valves to energize the power network PN. This in effect provides means for phase-shifting the voltage to the transformer T1 by providing an output voltage thereof which lags the voltage between lines L1 and L2. It should be here noted that while the core of the transformer T1 does not become saturated, the saturation effect in the reactor VR so regulates the voltage applied to the transformer T1 that within the useful phase-shifting range the voltage of the secondary coils 174 and 176 remains at a low value during the time delay afforded by the reactor VR, and then abruptly rises, due to the abruptly rising voltage applied across the primary coil 92. Thus the potentials of the igniters 166 and 168 are abruptly brought to the critical potentials for rendering the respective valves V1 and V2 conductive. It will be understood that while reference is made to the voltage applied across the transformer T1 and reactor VR, in effect the current through the circuit containing reactor VR and coil 92 is first limited in the major part by the reactor VR and then in the major part of the coil 92.

As soon as one of the valves V1 and V2 conducts, the potential across the firing network FN suddenly drops to a low value, which is substantially equal to that appearing across the conductive one of the valves V1 or V2, since the potential applied to the firing network is that appearing between the terminal 104 of the welding transformer and that of the line L1, which potential, when either of the valves V1 or V2 is conducting, is the potential drop through the conducting one of the valves V1 or V2. By a suitable adjustment of the magnitude of the reactance of the variable reactor VR, the valves V1 and V2 can be rendered conductive at any desired time interval after the corresponding one of the valves V4 or V5 has been rendered conductive to energize the firing network FN, so that a greater or lesser portion of the voltage wave between lines L1 and L2 can be applied to the welding transformer WT to control the heat supplied by the electrodes WE for welding the work W.

In Figs. 3, 5, 7, and 9 of the drawings the reference character ES shows the voltage impressed by the secondary coils 174 and 176 of the firing transformer T1 between the igniters and the cathodes associated therewith for various values of reactance of the variable reactor VR. The curves E of these figures represent the wave of the voltage appearing between the lines L1 and L2, while the curves I represent the current flow through the valves V1 and V2 and the primary coil of the welding transformer WT. The curves shown in Figs. 4, 6, 8, and 10 represent the power being taken from and returned to the lines L1 and L2 by the power network PN for the conditions represented by Figs. 3, 5, 7, and 9 respectively.

In Fig. 3 the value of the reactance of the reactor VR has been reduced substantially to zero so that a full current flow may be had to the welding transformer WT, otherwise known as full heat. In Fig. 5 enough reactance is introduced through the variable reactor VR to delay the application of the critical voltage to the igniter circuit a sufficient time interval so that the power supplied by the valves V1 and V2 to the welding transformer WT is substantially reduced, thereby reducing the heat supplied by the welding electrodes WF for the welding of the work W. In Fig. 7 still more reactance has been introduced by the variable reactor VR so that the time interval between the time the respective valves V4 and V5 are rendered conductive and the time that the corresponding secondary coils 174 and 176 of the firing transformer T1 apply the critical potential to the igniter circuits has been substantially lengthened so that the power supplied by the valves V1 and V2 to the welding transformer is still further reduced, reducing the heat applied by the electrodes WE for welding the work W.

In the showing of Figs. 3 through 8 a low load power factor has been assumed. Therefore, during each power cycle, power will be taken from and returned to the line, and the net power available to the welding transformer will be the difference in the areas of the loops appearing above and below the zero line. In each of the above instances the control resistor PR of the control network CN has been adjusted to provide for rendering the valve V3 conductive at an instant in the voltage wave which will render the valves V1 and V2 conductive with respect to the voltage wave between lines L1 and L2 at substantially the power factor angle, so that when the variable reactor VR is set to provide a minimum reactance, the valves V1 and V2 will be rendered conductive at substantially the instant the current in network PN would be zero so that, as far as possible, transients which occur when the valves V1 and V2 are rendered conductive at an angle less than that of the power factor angle are eliminated.

In Figs. 9 and 10 a relatively high power factor in the power network PN is assumed; the adjustment of reactor VR is such that a relatively low or medium heat is being supplied to the electrodes WE for welding of the work W. It will be noted that as the power factor of the power network PN is increased, the power loop appearing below the zero line of the power curve which represents the power being returned to the power lines L1 and L2 becomes less and would be eliminated entirely if the network were operating at a 100% power factor.

Referring to Fig. 2, wherein there is shown a modified form of the firing network FN1 for use with the networks CN and TN of Fig. 1, network FN1 is controlled by antiparallelly arranged back-to-back electric valves V6 and V7, valve V7 being arranged to trail the operation of valve V6 similarly to the trailing relation of valve V5 with respect to valve V4. Valve V6 has its grid connected to the conductor 84 of the time-controlling network TN and has its cathode connected to conductor 78 of the time-controlling network TN whereby valve V6 is normally biased into a non-conductive or blocked condition, but upon actuation of the time-controlling network TN the grid of valve V6 becomes positive with respect to its cathode as described hereinbefore with respect to the biasing of the grid and cathode of the valve V4. The anode of the valve V6 and cathode of the valve V7 are connected together and connected through a rectifier 210 (which can also be of the copper-oxide type) to the power conductor 170 connected to line L1, the cathode of the valve V2, and anode of valve V1. A rectifier 212 similar to the rectifier 210 is connected for flow of current from the valve V7 to the igniter of the valve V2. The cathode of the valve V6 and the anode of valve V7 are connected together and to a terminal or junction 216 and through a variable reactance VR and a rectifier 222 (which can be of the copper-oxide type) to the power conductor 172 connected to the line L2, the anode of valve V2, and the cathode of the valve V1. A rectifier 224 similar to rectifier 222 is connected for flow of current from the valve V6 to the igniter of the valve V1. The valves V6 and V7 have controlling circuits similar to the valves V4 and V5, including the transformer T3, the safety-control relay contacts SRa, condenser 152, and resistance 150. The trailing valve V7 is controlled by a network similar to the valve V5, including the transformers T2 and T6, condenser 134, and resistor 132, the primary coil of transformer T2 in this instance being connected between the anode of valve V7 and the line L2.

When the line L1 is positive with respect to the line L2 and the valve V6 is biased for current flow, current flows from the line L1 through the power conductor 170, the rectifying device 210, the valve V6, the variable reactor VR, the rectifier 225, the igniter and cathode of the valve V1, conductor 172, and primary coil of the welding transformer WT to line L2. This fires the valve V2 whereby energy is supplied from lines L1 and L2 by the valve V2 to the welding transformer WT. Conduction of the valve V6 also energizes a circuit from its cathode through the primary coil of transformer T2 to the line L2 whereby a voltage was induced by its secondary coil in the grid circuit of the valve V7. This voltage impulse is without effect for at least the reason that the anode of the valve V7 is negative with respect to its cathode. When the valve V6 becomes nonconductive at the end of the half cycle in which line L1 is positive with respect to line L2, the collapse of flux in transformer T2 acts to overcome the negative bias then being applied to the grid of valve V7 by the transformer T6 so that as the anode of valve V7 becomes positive with respect to its cathode, the grid is biased positively to render the valve V7 conductive. Current then flows from line L2 through the welding transformer WT, conductor 172, rectifying device 222, variable reactor VR, valve V7, rectifier 212, the igniter and the cathode of the valve V2 and conductor 170 to line L1. This causes the critical voltage to be applied to the igniter of the valve V2 which, as soon as the anode of valve V2 becomes positive with respect to its cathode, renders the valve V2 conductive and welding energy is supplied therethrough from the lines L1 and L2 to the welding transformer WT. Conduction of valve V7 also closes a circuit from line L2 through the primary coil of transformer T2, the valve V7, the rectifier 212, the igniter and cathode of valve V7 and the conductor 170 to line L1.

When valve V1 is conducting, most of the voltage drop in the circuit from line L1 through the valve V1, the welding transformer WT to line L2 is across the welding transformer WT, the drop across the valve V1 being only its normal voltage drop which, for purposes of explanation, will be considered as being 20 volts, while the line voltage is assumed to be 200 volts. This leaves 180 volts across the transformer WT and the potential of the cathode of valve V1 20 volts with respect to line L1. The impedance of the primary coil of transformer T2 is relatively high; and it is assumed that with the valve V6 conducting current through a circuit from line L1, rectifier 210, valve V6, reactor VR, the primary coil of transformer T2 to line L2, the drop across the primary coil is 170 volts. Under these conditions a 10-volt drop appears across a circuit from the cathode of valve V1, its igniter, rectifier 225 to the junction 216 between the reactor VR and primary coil of transformer T2. The junction 216, however, it at a lower positive potential than the cathode of valve V1, and current flow through the igniter of valve V1 will be blocked by the rectifier 225. It will be readily understood that as long as the voltage drop across the transformer WT is greater than the drop across the transformer T2, no current will flow in the igniter circuit which is desirable to prolong the life of the valve V1. However, in the broader aspects of the invention the valve V1 will give commercial service even though the voltage drop across transformer T2 may somewhat exceed that across the transformer WT. Should the valve V6 become nonconductive during the conductive period of valve V1, the potential of the junction 216 would become that of the line L2 and the rectifier 225 would block current flow.

With the valve V2 conducting, a somewhat different condition occurs with respect to current flow through the igniter for the valve V2 since the potential between the junction 216 and the line L1 with valve V7 conducting determines the current flow from junction 216 through valve V7, rectifier 212, and the igniter and cathode of the valve V2 to the line L1. The potential of terminal 16 is, of course, determined by the relative impedances of the welding transformer, rectifier 222, the variable reactor VR, and the kick transformer T2 and even though such potential may be high enough to maintain valve V7 in a conducting condition, the current through valve V7 and through the igniter of valve V2 is of a negligibly low value. In fact, by properly proportioning the aforesaid relative impedances the voltage of terminal 216 may be brought so low as to cause valve V7 to be extinguished as a consequence of the firing of the main valve V2. Under such conditions, the igniter of valve V2 is subjected to current flow only up to the time that valve V2 ignites.

The variable reactor VR, as described with respect to the form shown in Fig. 1, is of the saturable coil type and is arranged so that when the circuit therethrough is initially energized due to conduction of valve V6, substantially the entire voltage of the circuit will appear across the variable reactor VR until such time as the core of the variable reactor VR saturates. At that time its reactance becomes substantially reduced, and the critical voltage for rendering the valve V1 conductive will be applied between the igniter and cathode of tube V1. This increase in voltage between the igniter and cathode of the valve V1 will be sudden and sufficient to cause the igniter to render the valve V1 conductive. Adjustment of the value of the reactance of reactor VR will determine the time interval along the half cycle of voltage when line L1 is positive with respect to L2 that the valve V1 conducts to function as a heat control for the welding circuit.

When valve V7 conducts, the variable reactor VR will function in a similar manner to determine the time interval at which the valve V2 is rendered conductive in the half cycle of voltage when line L2 is positive with respect to L1. In this regard, it should be noted that the impedance of transformer T2 is high relative to that of the welding transformer WT which will have its secondary shorted through the welding electrodes and workpiece so that the critical potential to fire valve V2 cannot be applied from line L2 through transformer T2 but will be applied through the variable reactor VR and welding transformer WT. At full heat, with little or no reactance in VR, the transformer WT forms a virtual short circuit across the transformer T2. With the reactance of VR set for reduced heat the transformer T2 will conduct to junction 216, but at the minimum voltage drop across the transformer T2 the junction 216 will rise in potential sufficiently above the line L1 to permit the critical voltage to be applied to the igniter of the valve V2 by the circuit through transformer T2, and the critical potential must be supplied through the variable reactor VR.

The arrangement of Figure 1—A is the same as that of Figure 1, with the exception that the variable reactor VRa is provided with a pair of alternating current windings 240 and 242 and a direct current winding 244. Winding 244 may be supplied from any suitable direct current source, illustrated as a battery 246, and the circuit for winding 244 also includes a variable resistor 248, the adjustment thereof determines the excitation current of winding 244 and, consequently, determines the impedance of the reactor VRa, causing the same to become saturated at predeterminably variable values of current in the alternating current windings.

It will now be understood that these controls systems provide for a simple means for delaying the firing of the power-controlling valves V1 and V2 with respect to the voltage applied thereacross whereby the welding heat supplied by the welding transformer WT may be varied from a maximum to a minimum throughout the range of heat for which the welding power network TN has been designed and that this is accomplished in a simple, inexpensive, convenient manner which is trouble-free in operation and which, furthermore, may be applied to existing welding units of the general character described.

What is claimed and is desired to be secured by United States Letters Patent is as follows:

1. In an igniter for electric valve means having main electrodes and a control element and adapted to be rendered conductive upon the application of a firing potential between said control element and one of said main electrodes when the magnitude of said firing potential reaches a critical value, energizable circuit means coupled between said control element and said one main electrode for applying said firing potential therebetween, a reactor coupled in series circuit with said circuit means and operable to control the time, relative to the time said circuit means is energized, at which said firing potential attains said critical value, and means to vary the impedance of said reactor to thereby determine the magnitude of the time interval between the time of energization of said circuit means and the time said firing potential attains said critical value.

2. In an igniter for electric valve means having main electrodes and a control element and adapted to be rendered conductive upon the application of a firing potential between said control element and one of said main electrodes when the magnitude of said firing potential reaches a critical value, energizable circuit means coupled between said control element and said one main electrode for applying said firing potential therebetween, a saturating core-type reactor having an energizable winding and a saturable core coupled in series circuit with said circuit means and operable to control the time, relative to the time said circuit means is energized, at which said firing potential attains said critical value, and means to vary the current required to saturate said core to thereby determine the magnitude of the time interval between the time of energization of said circuit means and the time said firing potential attains said critical value.

3. In an igniter for electric valve means having main electrodes and a control element and adapted to be rendered conductive upon the application of a firing potential between said control element and one of said main electrodes when the magnitude of said firing potential reaches a critical value, energizable circuit means coupled between said control element and said one main electrode for applying said firing potential therebetween, a reactor coupled in series circuit with said circuit means and operable to control the time relative to the time said circuit means is energized at which said firing potential attains said critical value, and means operative as a consequence of said valve means being rendered conductive for substantially reducing said firing potential when said valve means is rendered conductive.

4. In an igniter for electric valve means having main electrodes and a control element and adapted to be rendered conductive upon the application of a firing potential between said control element and one of said main electrodes when the magnitude of said firing potential reaches a critical value, energizable circuit means coupled between said control element and said one main electrode for applying said firing potential therebetween, a reactor coupled in series circuit with said circuit means and operable to control the time relative to the time said circuit means is energized at which said firing potential attains said critical value, said circuit means being energized with a potential which is a function of that between said main electrodes.

5. In an igniter for electric valve means having main electrodes and a control element and adapted to be rendered conductive upon the application of a firing potential between said control element and one of said main electrodes when the magnitude of said firing potential reaches a critical value, energizable circuit means coupled between said control element and said one main electrode for applying said firing potential therebetween, a reactor having an impedance which varies as a function of the current flowing therethrough coupled in series circuit with said circuit means and operable to control the time, relative to the time said circuit means is energized, at which said firing potential attains said critical value, and means for selectively adjusting said impedance function.

6. In an igniter for electric valve means having main electrodes and a control element and adapted to be rendered conductive upon the application of a firing potential between said control element and one of said main electrodes when the magnitude of said firing potential reaches a critical value, energizable circuit means coupled between said control element and said one main electrode for applying said firing potential therebetween, a reactor having an impedance which varies as a function of the current flowing therethrough coupled in series circuit with said circuit means and operable to control the time, relative to the time said circuit means is energized, at which said firing potential attains said critical value, means for selectively adjusting said impedance function, and means operative as a consequence of said valve means being rendered conductive for substantially de-energizing said serially arranged reactor and circuit means when said valve means is rendered conductive.

7. In an igniter for electric valve means having main electrodes and a control element and adapted to be rendered conductive upon the application of a firing potential between said control element and one of said main electrodes when the magnitude of said firing potential reaches a critical value, energizable circuit means coupled between said control element and said one main electrode for applying said firing potential therebetween, a reactor having an impedance which varies as a function of the current flowing therethrough coupled in series circuit with said circuit means and operable to control the time, relative to the time said circuit means is energized, at which said firing potential attains a said critical value, and means for selectively adjusting said impedance function, said circuit means being energized by a potential which is variable in accordance with the variation of potential appearing between said main electrodes.

8. In an igniter circuit for electric valve means having main electrodes and a control element and adapted to be rendered conductive upon the application of a critical firing potential between said control element and one of said electrodes, conductor means adapted to be connected between said control element and said one electrode for applying said critical potential, circuit means adapted to be supplied with an electric potential, and means electrically coupling said circuit means to said conductor means including a serially arranged variable impedance reactor controlling the magnitude of said potential applied to said conductor means, and means operative as a consequence of said valve means being rendered conductive for substantially reducing the potential supplied to said conductor means when said valve means is rendered conductive.

9. In an igniter circuit for electric valve means having main electrodes and a control element and adapted to be rendered conductive upon the application of a critical firing potential between said control element and one of said electrodes, conductor means adapted to be connected between said control and said one electrode for applying said critical potential, circuit means adapted to be supplied with an electric potential, and means electrically coupling said circuit means to said conductor means including a serially arranged saturating core reactor controlling the magnitude of said potential applied to said conductor means, and means for varying the saturating function of said reactor whereby to control the time of firing of said valve means.

10. In an igniter circuit for electric valve means having main electrodes and a control element and adapted to be rendered conductive upon the application of a firing potential between said control element and one of said main electrodes when the magnitude of said firing potential reaches a critical value and having said main electrodes coupled with a main circuit for controlling the energization thereof, a control network having potential output terminals coupled between said control element and one of said main electrodes for applying said critical potential therebetween, said network having input terminals connected to receive a potential variable in accordance with the potential appearing across said main electrodes and having a transformer and a symmetrically saturable core reactor connected in series circuit with one of the windings of said transformer.

11. The combination of claim 10 in which said one transformer winding is a primary winding of said transformer and in which said network includes a selectively actuated switch means for energizing said network.

12. In an igniter for a pair of reversedly connected electric valves each having a mercury-pool cathode and an anode and an igniter in contact with the respective cathode, a saturatable reactor having terminals, a first unidirectional flow device, means connecting one of said terminals to said igniter of one of said valves through said first device, a second unidirectional flow device, means connecting the other of said terminals to said igniter of the other of said valves through said second device.

13. The combination of claim 12 in which said one terminal is connected through a unidirectional current flow device to said cathode of said one valve and said other terminal is connected through a unidirectional current flow device to said cathode of said other valve and in which said unidirectional current flow devices are arranged to permit current flow solely from said cathodes to said terminals.

14. The combination of claim 11 in which said switch means comprises reversedly connected electric valves, means operable to hold said valve nonconductive, means for rendering one of said valves conductive, and means responsive to a conductive condition of said one valve for rendering the other of said valves conductive.

CLETUS J. COLLOM.

REFERENCES CITED

The following references are of record in the file of this patent:

UNITED STATES PATENTS

| Number | Name | Date |
|---|---|---|
| 2,104,690 | Bedford | Jan. 4, 1938 |
| 2,157,812 | Bedford | May 9, 1939 |
| 2,370,287 | Bivens | Feb. 27, 1945 |
| 2,372,128 | Smith | Mar. 20, 1945 |
| 2,373,545 | Cooper | Apr. 10, 1945 |
| 2,401,013 | Pakala | May 28, 1946 |
| 2,421,994 | Cooper | June 10, 1947 |

Certificate of Correction

June 20, 1950

Patent No. 2,512,482

CLETUS J. COLLOM

It is hereby certified that error appears in the printed specification of the above numbered patent requiring correction as follows:

Column 3, line 5, for "Transformer T1" read *Transformer T4*; and that the said Letters Patent should be read with this correction therein that the same may conform to the record of the case in the Patent Office.

Signed and sealed this 12th day of September, A. D. 1950.

[SEAL]

THOMAS F. MURPHY,
*Assistant Commissioner of Patents.*